June 12, 1951 W. C. NEIN 2,556,734

LIST FINDING DEVICE

Filed Nov. 22, 1947

INVENTOR
William C Nein

Patented June 12, 1951 2,556,734

UNITED STATES PATENT OFFICE 2,556,734

LIST FINDING DEVICE

William C. Nein, New York, N. Y.

Application November 22, 1947, Serial No. 787,562

3 Claims. (Cl. 40—104)

This invention relates to index registers or list finders and more particularly to an improved form of loose leaf index register for desk use.

The main object of the invention is to provide an improved index register which is simple to make and efficient in operation.

Another object of the invention is to provide an index register of improved construction whereby any desired sheet thereof can be quickly and readily made available for reference or the entry of items.

In the accompanying drawing which forms part of this specification:

Figure 1:
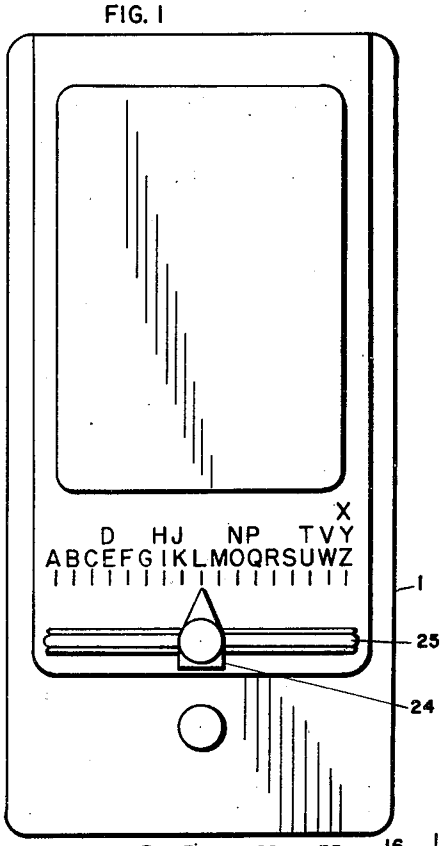
Fig. 1 is a top plan view of the index register.

The particular embodiment of the invention shown in the drawing is an alphabetical index register adapted for various uses such as a telephone directory. It is essentially a flat case open at one end and at the top with a specially designed openly biased hinged cover, which cover when lowered closes the open end and the top of the case. The cover is openly biased by means of a spring and is held closed by a push button operated spring catch which engages a latch on the cover. Within the base is a stack of loose cards forming a register and which cards are so arranged and notched on one end as shown on the drawing, that a finger on the inside of the cover corresponding to an index pointer on the outside of the cover will separate any number of the stack of cards at any desired point of separation as may be indicated by the pointer on a suitable scale such as the alphabet. When the cover, which is openly biased, is released by pushing a suitable button, such as is illustrated in the drawing, it simply lifts one end of the separated cards and allows the other end of the cards to slide into a recess formed by the hinged end of the cover as it is opening and after it has opened, no hinging of the cards being necessary as can readily be seen from the drawing. This construction is adapted to standard commercial stock size cards which are readily removable for notations thereon and which are easily replaceable.

Figure 2:
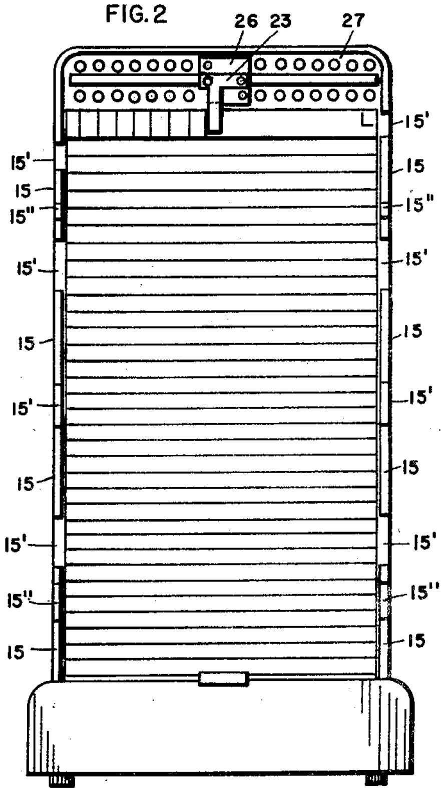
Fig. 2 is a front elevation view of the index register shown in Fig. 1 with the cover open showing a number of the index cards held by the cover, one of which cards is held in a completely exposed position.
Figures 3, 4, 8:
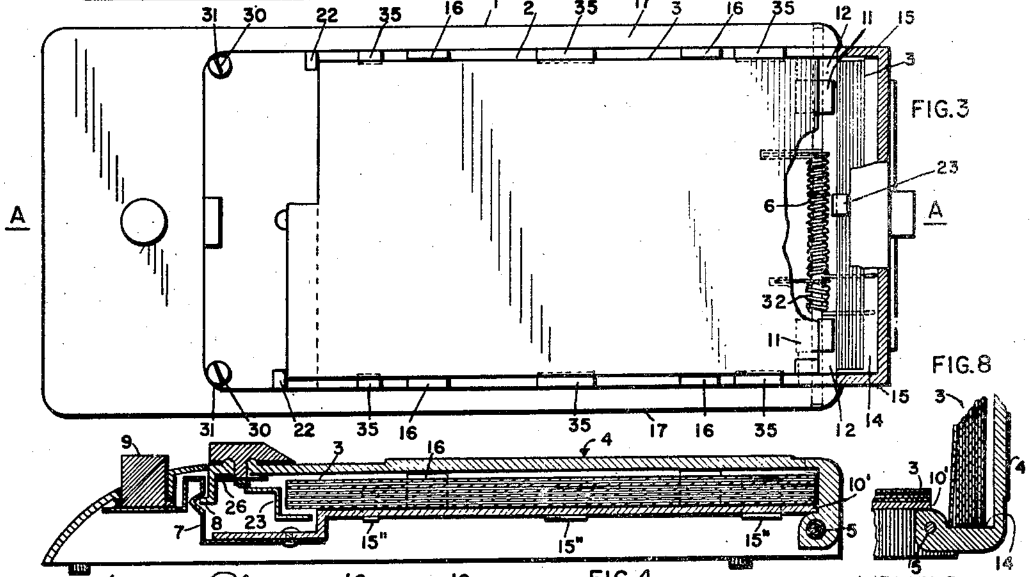
Fig. 3 is a top plan view of the index register with the cover open showing some of the cards in the base and others being held open by the cover.
Fig. 4 is a sectional elevation of Fig. 3 on the center line A—A.
Fig. 8 shows a sectional view of the cover hinge with some of the cards in the base and some in the novel hinge pocket, which pocket holds the cards in an operable position.

Referring to the drawing, 1 is the case or base having a suitable space 2 for a stack of loose cards 3 which cards rest on a floor 10 in the base, and 4 is a specially designed hinged cover as shown. The cover 4 is pivotally connected to the base 1 by means of suitable projections on it which are adapted to match with similar projections on the base and which together with the rod 5 form a novel form of hinge which will be described more in detail later. This hinge is one of the novel features of the invention and makes suitable the use of loose cards. The cover 4 is biased to an open position as shown by means of a suitable spring 6 and when closed is held closed by a spring catch 7 mounted in the base 1 which catch 7 engages a latch 8 on the cover holding it in a closed position as is best shown in Fig. 4. A push button 9 when depressed releases the cover 4 which immediately assumes an open position as shown in Figs. 2 and 3, exposing to view two of the register cards, namely the one lifted by the cover and the one left on the top of the stack in the base. As can be seen from the drawing, Figs. 3-4-8 the novel connection of the hinged cover 4 to the base 1 consists of downward and outward projections 11—11, which may be an integral part of the floor 10 if so desired, or they may be separate parts fastened to the floor 10 by any suitable means, which have a hole the center line of which is directly below the end 10′ of the floor 10 suitable to receive the hinge rod 5. The cover 4 has similar projections 12—12 which fit between the side walls 13—13 of the base 1 and the projections 11—11 of the floor 10 and which have a similar hole the center line of which is also directly below the end 10′ of the floor 10 and suitable to receive the hinge rod 5. As can be readily seen the whole thus forms a pocket-like hinged construction for the rear end of the index cards into which they slide and are held standing on end when the cover 4 opens. The open movement of the cover 4 is limited by the projections 12—12 meeting the bottom of the floor 10 at the points 18—18, or by having its end 14 meet the ends of the projections 11—11, It will thus be seen from Fig. 4 that with the cover 4 in the closed position the inside of its end wall 14 fits up close to the end 10′ of the floor 10 and when in the open position Figs. 2–3–8 the end wall 14 forms a depressed recess which is closed on its ends by suitable sides 15—15 of the cover 4. These side walls 15—15 of the cover 4 are notched at 15′—15′ to match projections 16—16 on the side walls 17—17 of the base 1 as can be seen from Figs. 2 and 3 and both act as a guide to assure that the cards are kept in a properly aligned position in both the cover 4 and the base 1. As an added precaution to assure proper alignment of the cards in the cover when it is open the cover sides 15—15 have projections 15″—15″ which extend from them any desired distance or length and extend thru the floor of the base at holes 35—35—35 when the cover 4 is closed as can be seen in Figs. 2, 3 and 4. The position of the stack of loose cards 3, comprising the index register, on the floor of the base 1 is fixed by the projections 16—16 and 22—22 as can be seen in Figs. 3 and 4. The position of some or all of the cards when lifted by the cover 4 is fixed by the sides 15—15 and 15″—15″ of the cover and the end 14.

Referring to Figs. 1, 2, 3 and 4. As previously mentioned the index register as shown is an alphabetical telephone register. Provision for selecting any point of separation of the register cards 3 is made by means of an index pointer 24 which is arranged to slide in a slot 25 of the cover 4 opposite a suitable scale such as the alphabet, and to which the card lifting finger 23 is fastened. Selection of a particular point of separation such as at L is facilitated by having a flat spring 26 with beads on it which slide into small depressions 27 in the cover 4.

Figures 5, 6, 7:
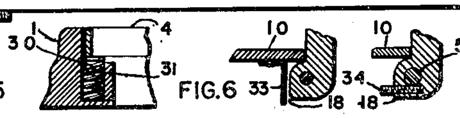
Fig. 5 shows a partial sectional view of one of the two cover starter springs.
Fig. 6 shows a frictional cover retarding device.
Fig. 7 shows a spring shock absorber for the cover of the index to bring it to a smooth stop after being released.

Referring now to Figs. 3 and 5, 30—30 are coil springs placed in suitable holes 31—31 in the base 1 which exert an upward pressure, against the cover 4 when it is closed, of sufficient magnitude to break the starting friction of the cover when it is released by pushing button 9. As can be seen by the construction of the cover 4, base 1 and spring 6, a small amount of friction at or near the front end of the cover would require a strong spring to brake it with the leverage as the construction shows and would lift the cover with a bang if made sufficiently strong. Also with the finger 23 lifting all of the cards a much greater burden is imposed on the spring 6 than when no cards are lifted as at the A position. The springs 30—30 give the cover a start so that irregularities in starting friction which creep in in actual manufacturing are compensated for, thereby making a smoother operating cover.

Referring now to Figs. 3, 6 and 7. As stated above while it is desirable to have means for starting the cover in a practical way when it is released, it is also desirable to have means for bringing it to a stop in a smooth manner. The spring 32 in Fig. 3 is such a means. It acts in the opposite direction to the spring 6 at the end of its stroke and brings the cover 4 to a smooth stop. In Fig. 6 another form to accomplish this end is shown; the spring 33 fastened to platform 10 is in the path of travel of the projection 18 of the cover 4 so when the cover nears the end of its open stroke the projection strikes the spring which brings the cover to a smooth stop at the end of its stroke. In Fig. 7 the same idea is shown with a small coil spring 34 striking against the bottom of the floor 10 bringing the cover to a stop in a desirable manner.

The operation of the device while quite obvious from the several figures in the drawing, may be briefly described as follows: Assume that a name beginning with the letter L is desired from the index. The first operation is to move the index pointer 24 opposite the letter L on the cover 4, push the button 9 which will release the catch 7 from the latch 8 and the cover will be immediately opened by the springs 30—30 and the spring 6 exposing to view the two cards marked L, one standing vertical on the inside of the cover 4 and the other lying horizontal in the base 1 as shown in Figs. 2 and 3. If it is desired to add a name to the list under the letter L, since all cards are loose, all that need be done is to pick the card out of the base 1, add the name by typewriter or by script and then replace the card. In case the name is to be added to the card carried by the cover 4, simply bend the card until it slips out from under the finger 23, add the name and replace in a like manner.

What I claim is:

1. In a device of the class described, the combination of a base, a plurality of superimposed index cards loosely mounted on the base, a cover hingedly connected to the base, a first spring biasing said cover to an open position, means for releasably holding said cover in a closed position, means on said cover for selectively engaging any of the cards for movement therewith, and additional resilient means in the base tending to open the cover and engaging the free end of the cover in its closed position.

2. The structure set forth in claim 1 wherein there is provided a spring means adjacent the hinge of said cover biased to oppose said first spring at the end of the opening movement of the cover.

3. The structure set forth in claim 1 wherein there is provided a friction means adjacent the hinge of said cover biased to oppose said first spring at the end of the opening movement of the cover.

WILLIAM C. NEIN.

REFERENCES CITED

The following references are of record in the file of this patent:

UNITED STATES PATENTS

| Number | Name | Date |
|---|---|---|
| 1,895,409 | Drucker | Jan. 24, 1933 |
| 2,115,537 | Peter | Apr. 26, 1938 |
| 2,141,761 | Pollock | Dec. 27, 1938 |
| 2,223,966 | Petersetal | Dec. 3, 1940 |